(12) United States Patent
Saunus et al.

(10) Patent No.: US 6,247,218 B1
(45) Date of Patent: Jun. 19, 2001

(54) PROCESS FOR CONNECTING A WINDOW PANE TO A WINDOW LIFTER

(75) Inventors: Christian Saunus, Grünbach (DE); Jörgen Sträng, Vastra Frölunda (SE)

(73) Assignee: Brose Fahrzeugteile GmbH & Co. KG Coburg, Coburg (DE)

( * ) Notice: Subject to any disclaimer, the term of this patent is extended or adjusted under 35 U.S.C. 154(b) by 0 days.

(21) Appl. No.: 09/363,537

(22) Filed: Jul. 29, 1999

(30) Foreign Application Priority Data

Jul. 30, 1998 (DE) .............................................. 198 36 077

(51) Int. Cl.⁷ ...................................................... B23P 11/00
(52) U.S. Cl. ........................... 29/434; 29/407.01; 29/430; 29/281.5
(58) Field of Search ................................ 29/407.01, 434, 29/430, 464, 771, 783, 791, 795, 281.5; 49/372, 374, 506; 198/378; 53/242, 243

(56) References Cited

U.S. PATENT DOCUMENTS

| | | | |
|---|---|---|---|
| 3,858,381 | * 1/1975 | Huber et al. ............................. | 53/242 |
| 4,295,262 | * 10/1981 | Grote et al. . | |
| 4,609,093 | * 9/1986 | Taketani et al. ......................... | 29/430 |
| 4,716,682 | * 1/1988 | De Rees .................................. | 49/374 |
| 4,766,714 | * 8/1988 | Sugaya .................................... | 53/242 |
| 4,831,710 | * 5/1989 | Katoh et al. ............................ | 29/430 |
| 5,121,534 | * 6/1992 | Kruzich . | |
| 5,379,571 | * 1/1995 | Gottfried ................................. | 53/243 |
| 5,507,085 | * 4/1996 | Easton et al. ...................... | 29/407.01 |
| 5,621,960 | * 4/1997 | Kaminski . | |

* cited by examiner

Primary Examiner—P. W. Echols
Assistant Examiner—Steve Blount
(74) Attorney, Agent, or Firm—Christie, Parker & Hale, LLP

(57) ABSTRACT

A method of connecting a window pane 1 to a window lifter 3 disposed in the door body 20 of a motor vehicle door 2 wherein, before connection, the motor vehicle door 2 and the window pane 1 are rotated by approximately 180° around an axis running through the surface of the motor vehicle door 2, and the window pane 1 is positioned below the door body 20 in an upside down position. The door body 20 and the window pane 1 are aligned relative to each other for connection of attachment points of the window pane 1 with attachment elements 33, 34 in the door body 20, and the distance between the attachment points and the attachment elements is reduced until a predefined final position is reached.

14 Claims, 3 Drawing Sheets

PROCESS FOR CONNECTING A WINDOW PANE TO A WINDOW LIFTER

BACKGROUND OF THE INVENTION

The invention concerns a process and a device for connecting a window pane with a window lifter disposed in the door body of a motor vehicle.

In the assembly of a motor vehicle door 2 according to FIG. 1, the motor vehicle door 2 is moved along an assembly line by means of a transport device 4 and, first, a window lifter 3 in the form of a cable window lifter depicted in FIG. 1 or a cross arm window lifter is inserted into the door body 20 of the motor vehicle door 2 and connected to an inside panel, carrier panel, or door module of the motor vehicle door 2. Before the connection of the window lifter 3 to a window pane 1, the tabs 33, 34 of the window lifter 3 guided in the guide rails 31, 32 are moved into a position A adjacent to the upper edge 21 of the motor vehicle door 2. The window pane 1 held in a jig 6 above the door body 20 of the motor vehicle door 2 is next inserted with its bottom edge 11 in a slit formed on the upper edge 21 of the motor vehicle door 2 into the shaft of the door body 20 and set in the tabs 33, 34.

Since in this upper position A, adjustment and clamping of the window pane 1 to the attachment points 15, 16 in the tabs 33, 34 is not possible because of the construction of the door body 20, the window lifter 3 is moved by means of the window lifter drive 30 and the cable 39 into an adjustment and clamping position B, at which point the bottom edge 11 of the window pane 1 is connected to the tabs 33, 34.

For the precise alignment of the window pane 1 relative to the car door 2, the window lifter 3 is again moved into position A such that the top edge 12 and one or both side edges 13, 14 of the window pane come into position against the jig 6. In this position, the window pane 1 is readjusted and then driven again by means of the window lifter 3 to the adjustment and clamping position B, at which point the bottom edge 11 of the window pane 1 is clamped into the tabs 33, 34.

By moving again to the top positions A, it is possible to verify the correct alignment of the window pane 1 relative to the door body 20 or to the motor vehicle door 2. If the alignment of the window pane 1 is incorrect, the window pane is again moved to the adjustment and clamping position B depicted by broken lines and the window pane 1 is readjusted by loosening the clamping of the bottom edge 11 of the window pane 1 in the tabs 33, 34 and reconnecting the window panel with tabs 33, 34 of the window lifter 3 positively and/or non-positively. These assembly steps are repeated until the window pane 1 is precisely aligned.

The known assembly process does not ensure a reliable and positionally accurate placement of the window pane 1 relative to the motor vehicle door 2. After insertion of the window pane 1 and a one-time movement to the adjustment and clamping position B, it may be necessary to move the window pane 1 several times between positions A and B. This repetitive process is associated with a high expenditure of time for the exact adjustment and alignment of the window pane 1.

SUMMARY OF THE INVENTION

The object of the present invention is to simplify and shorten the assembly process such that the assembly and adjustment expenditure, the costs of the assembly process and the cycle times are reduced.

This object is accomplished according to the present invention.

The solution according to the present invention enables automatic alignment of the window pane by using gravity to hold the window pane, in a jig, moving the window lifter to the adjustment and clamping position, and clamping the window pane in this position. This process a lowers the assembly and adjustment expenditure, as well as reducing the cost of the assembly process and possibly reducing cycle times.

The solution according to the present invention starts from the knowledge that in the prior art assembly, gravity interferes with the adjustment of the window pane relative to the motor vehicle door because no active elements are present holding the position of the window pane. With movement of the window lifter into the upper position with normal placement of the motor vehicle door, i.e., with the outward movement of the window pane, the adjustment elements are not accessible, such that it is necessary to alternate between the position in which the window pane is accepted by the window lifter and the position in which the window pane is adjusted and clamped in. By rotating the assembly direction to an "upside down" assembly position, gravity is used both for the automatic alignment of the window pane in a jig holding the window pane and for maintaining this alignment such that only a one-time movement to the adjustment and clamping position is necessary.

To connect the window pane automatically aligned in the jig with the holding and guide elements of the window lifter, the window pane held in the jig and the door body are moved relative to each other until the attachment point(s) of the window pane can be connected with the tabs of the window lifter in the predefined final position, i.e., in the adjustment and clamping position. This relative movement during the bringing together of the door body or of the window lifter attached in the door body and the window pane can occur by lifting the window pane held in the jig, lowering the door body with the window lifter attached therein, or lowering the door body with simultaneous lifting of the window pane or the jig to hold the window pane.

According to an advantageous embodiment of the solution according to the present invention, the door body and the jig are brought into the "upside down position" by means of a guide device, whereby the guide device determines the path of the bringing together of the door body and the window pane until the final or adjustment position is reached. The bringing together of the window pane and the door body can occur by means of a movement of the jig and/or the door body on a predefined assembly path such that a reliable, reproducible movement of the door body and the window pane is guaranteed in the assembly process.

The window pane and the door body may be aligned perpendicular to each other before assembly, i.e., the planes of the window pane and of the door body form a right angle with the horizontal plane or the assembly floor such that the window pane is guided perpendicularly into the door shaft or the door shaft perpendicularly accepts the window pane. Alternatively, the "upside down assembly" can take place relative to horizontal plane at angle of inclination of the window pane which is less than 90° such that the assembly path runs at a predefined angle relative to the horizontal plane.

In an advantageous improvement of the process according to the present invention, a plurality of window panes are placed in a magazine provided with jigs and the magazine is moved substantially perpendicular to the conveyor direction of the motor vehicle door in the "upside down position" to the subsequent connection of the window pane to the window lifter located in the door body.

With the supplying of a plurality of window panes with the jigs aligned and holding the window panes in a magazine, first, the cycle time of the assembly process is further shortened since to supply a window pane, the magazine must merely be moved farther by one unit crosswise to the transport direction of the motor vehicle door, and, also, a compact transport unit with a plurality of window panes, brought together in the magazine is produced.

In one embodiment of the process according to the present invention, the window pane is clamped before connection by its edge or in the region of its top edge in removable attachment parts of a lifting device. This supplying of the window panes in a device, like a "counter window lifter," combines the holding and alignment of the window pane with the guidance of the window pane along the predefined assembly path such that the assembly process is further simplified and shortened in terms of time.

According to a preferred assembly process, the window lifter is moved into the final position adjacent to the top edge of the door body and the attachment points of the window pane are temporarily connected with the attachment elements of the window lifter, and, following that, the window lifter with the window pane is moved into an adjustment position, at which point the window is permanently connected to the window lifter.

If the window pane and/or the window lifter are designed such that upon reaching the final position before connection of the window pane to the window lifter by shortening the distance between the window pane and the window lifter, the window pane is automatically connected with the window lifter, an automatic blind assembly of the window pane without additional assembly handles is possible, such that the assembly can be performed almost completely automated.

After completion of the assembly, a function test may be performed, in particular including the jig for supplying the window pane, in which, for example, the closing force and/or the excess force of the window lifter are determined and recorded in a test protocol or possibly readjusted.

A device for connecting a window pane to the window lifter disposed in the door body or motor vehicle door is characterized in that the motor vehicle door is connected with a conveyor device which holds the motor vehicle door in an alignment rotated by approximately 180° around an axis running through the surface of the vehicle door, that the window pane is disposed in a jig which holds the window pane below the door body and in alignment rotated by approximately 180° around an axis running through the surface of the motor vehicle door (upside down positions), and that a guidance device is provided which moves the window pane and/or the door body into a final assembly position.

The device according to the present invention also enables automatic alignment of the window pane by using gravity to hold the window pane in a jig, moving the window lifter to the adjustment and clamping position, and clamping the window pane in this position. This device leads to a reduction of the assembly and adjustment expenditure as well as a reduction in the cost of the assembly process and possibly a reduction of the cycle times.

The device substantially makes use of the conveyor devices existing for motor vehicle assembly which must be augmented only enough that rotation of the motor vehicle door into the "upside down position" is possible. If the window pane held in the jig is inserted into the door shaft after alignment of the window pane and the door body, no further change in the conveyor devices for the door bodies is necessary. Thus, simple and rapid assembly with lower assembly costs and reduced cycle times is provided without significant interventions into the assembly system.

Preferably, the jig holding the window pane supports the upper edge and/or the side edges of the window pane at a plurality of support points such that a reliable, reproducible alignment of the window pane under the effect of gravity is guaranteed even with a subsequent movement of the unit formed by the window pane and the jig by sliding and/or turning the unit in the direction of the door body or of the door shaft.

In an advantageous embodiment of the device according to the present invention, the jig is made of a dimensionally stable material with permanent reference edges in the form of bearing services or stop edges for precise alignment of the window pane, in particular of plastic, aluminum, or shaped paper/shaped cardboard such that a lightweight, stable unit is made of the window pane and jig, which both facilitates the assembly process and acts as a light, break-resistant, stable transport package.

By means of a device to record characteristic values or characteristic curves of the window lifter, testing of the function and/or parts of the window lifter as well as a device for comparison of the test values with predefined limit values or set points, the assembly can be associated with additional measures for quality assurance and safety testing which can be performed in the upside down positioning without requiring otherwise necessary testing, recording, and storage devices. Thus, for example, the device may consist of sensors disposed on the jig for measurement of the closing force and/or the excess force of the window lifter.

DESCRIPTION OF THE DRAWINGS

The idea underlying the invention is explained in detail with reference to one exemplary embodiment depicted in the drawings. They depict.

DETAILED DESCRIPTION OF THE INVENTION

Figure 1:
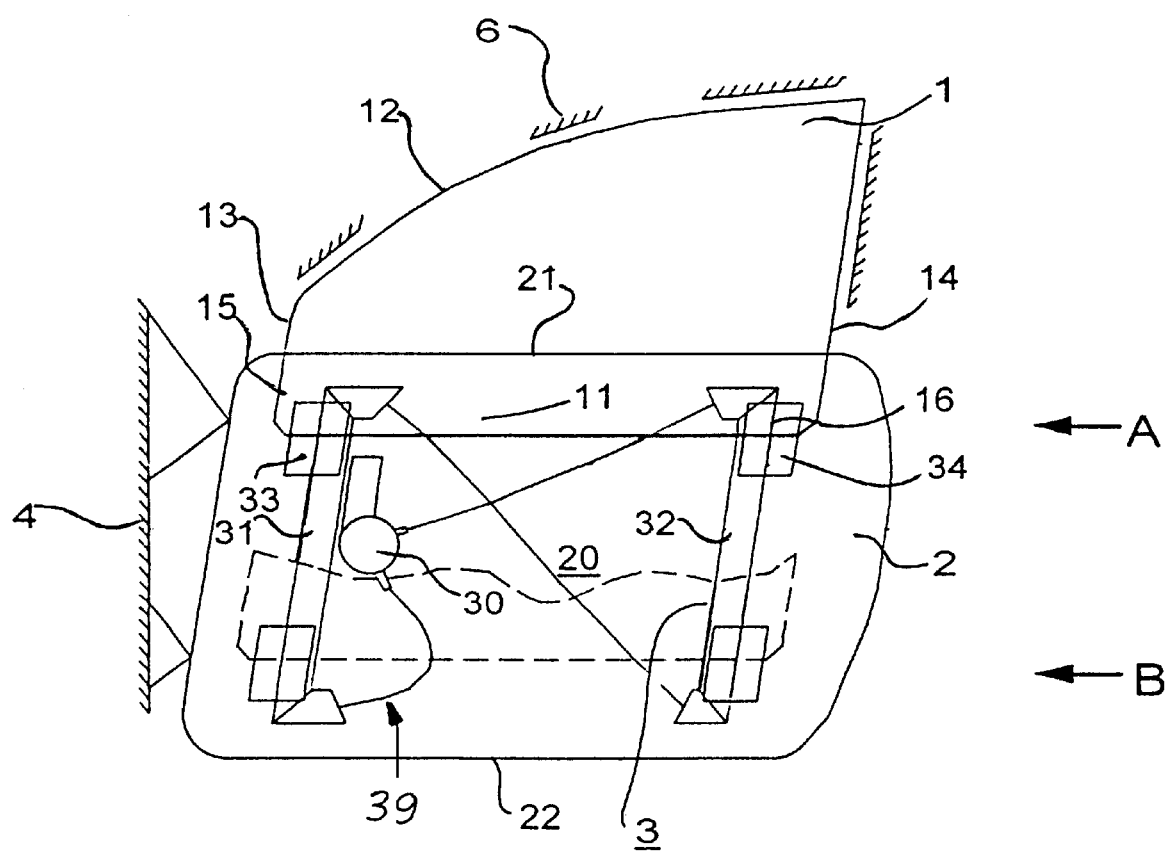
FIG. 1 shows alignment of a window pane and a door body before and during assembly according to the prior art.
Figure 2:
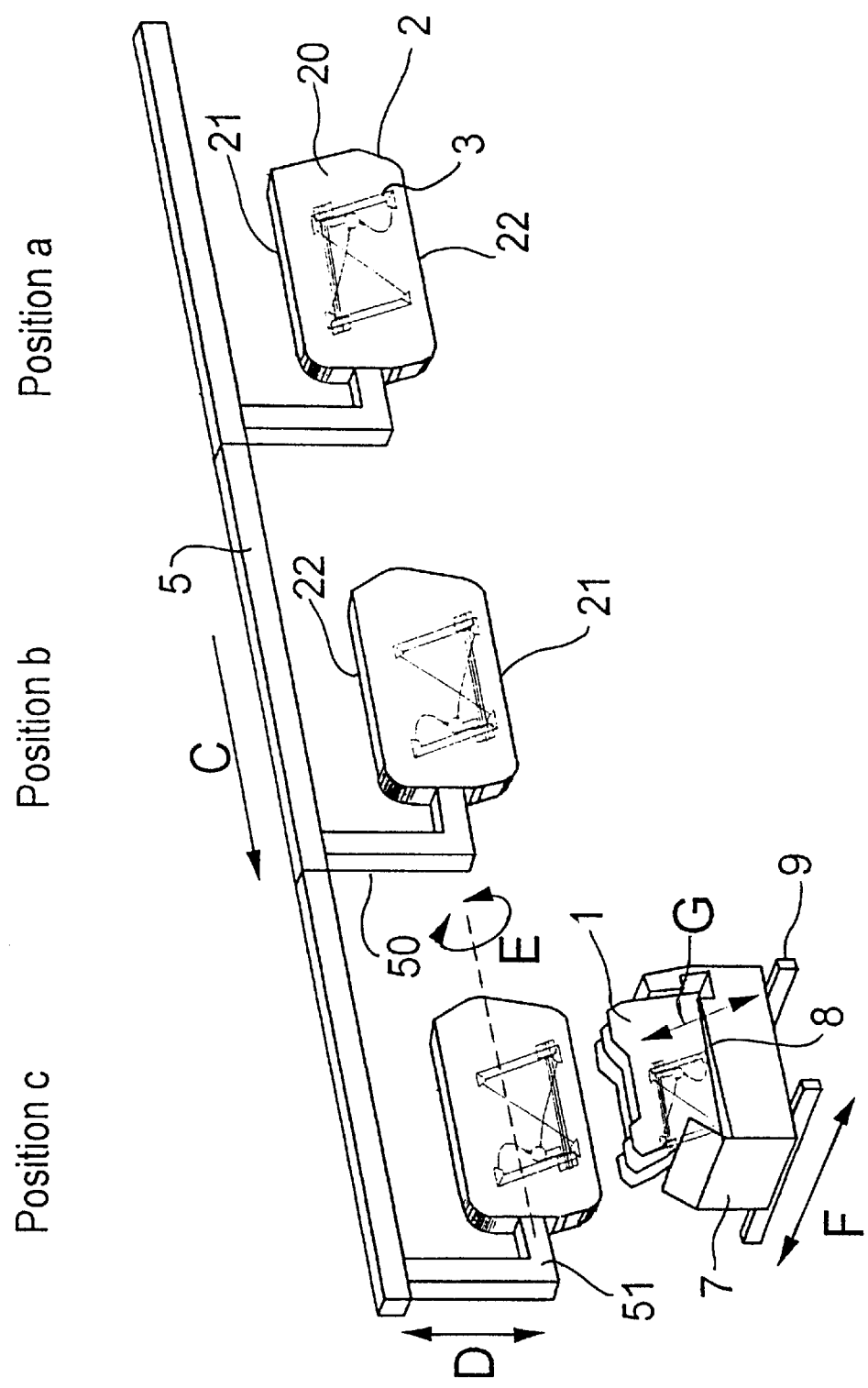
FIG. 2 is a schematic, perspective depiction of a conveyor belt or chain conveyor for motor vehicle doors and a magazine to supply window panes.

FIG. 2 is a schematic, perspective depiction of a conveyor device 5 for motor vehicle doors 2, which are moved in the direction of the arrow C. In a first assembly position (position a), the window lifter 3 is inserted into the door body 20 and connected to the inside panel or to a support panel of the motor vehicle door 2.

After assembly of the window lifter 3 in the door body 20, the motor vehicle door 2 is rotated (position b) by means of a swivel arm 51, according to the arrow E, by 180° around the longitudinal axis of the motor vehicle door 2, such that the bottom edge 22 of the motor vehicle door 2 is above the top edge 21. Of course, the rotation of the motor vehicle door relative to the installation position on the motor vehicle may also take place before the assembly of the window lifter 3, such that the window lifter 3 is also inserted in the door body 20 in the "upside down position".

In the "upside down position", the door body 20 is (position c) above a magazine 7 containing a plurality of window panes 1. The magazine 7 is moved on guide rails 9 in the direction of arrow F perpendicular to the direction of conveyance C of the conveyor device 5 such that in each window pane 1, supplied in an "upside down position" in the magazine 7, is disposed with its bottom edge under the top edge 21, i.e., is disposed under the slot formed in the top edge 21 of the door body 20. The window panes 1 are either held in a jig associated with each window pane 1 inside the magazine 7 or the magazine 7 is designed such that it simultaneously forms jigs for the window panes 1 disposed therein.

By means of a lifting device 8, which is movable in the direction of arrow G, one window pane 1 is lifted and moved into the door shaft of the door body 20 until the bottom edge 11 of the window pane 1 is accepted in the adjustment and clamping position by tabs 33,34 of the window lifter 3. In this position the clamping of the window pane 1 in the tabs of the window lifter 3 can occur manually, or blind assembly can be carried out with an automatic acceptance of the window pane 1 in the tabs of the window lifter 3.

After the connection of a window pane 1 to the window lifter 3 of a door body 20, the conveyor device 5 moves farther in the direction of arrow C and guides the next door body to the assembly position. Simultaneously, the magazine 7 moves on the guide rails 9 crosswise of the conveyor device, along arrow F, such that the next window pane 1 is disposed below the window shaft of the appropriate motor vehicle door 2 and the above-described assembly steps can be performed again.

An alternative to the lifting of the window pane 1 by means of a lifting device 8 for the transfer of the window pane 1 into the adjustment and clamping position is that the conveyor device 5 can be moved by means of a raising and lowering arm 50 in the direction of arrow D such that the vehicle door 2 is brought near the adjustment and clamping position. Optionally, even a combination of two lifting device is possible such that the window pane 1 is raised by means of the lifting device 8 and the appropriate motor vehicle door 2 is lowered by means of the raising and lowering arm 50.

The window panes 1 are found in the magazine 7 in the "upside down position", into which they are brought immediately before assembly by an assembler who inserts the window panes into a jig with preferably three support points such that the window panes 1 are aligned in the assembly direction. Alternatively, a plurality of window panes 1 can be delivered "upside down" in the magazine as an assembly unit and the magazine is set on the guide rails 9. The further conveyance of the magazine 7 can then occur just as fully automatically as the lifting of the window panes by means of the lifting device 8.

Figure 3:
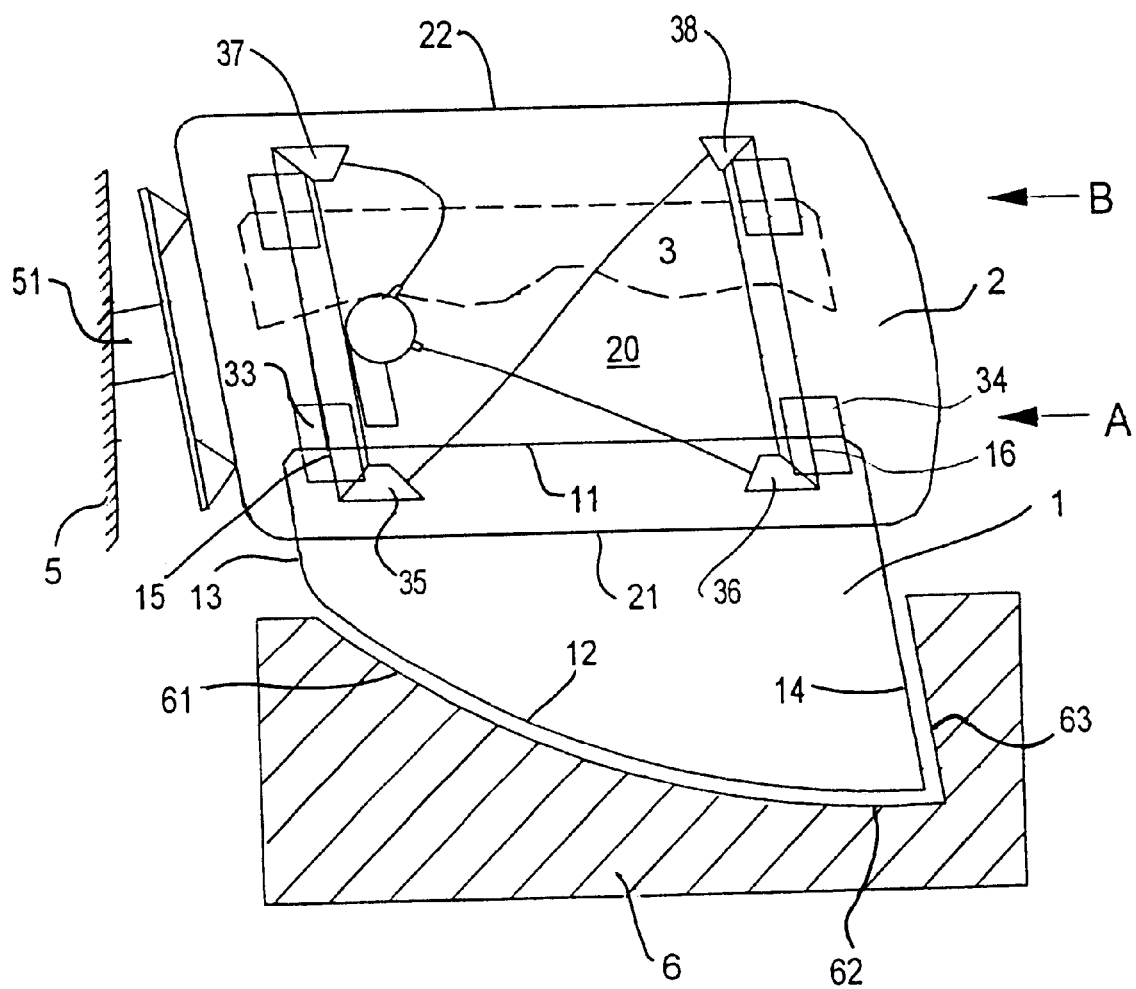
FIG. 3 is a depiction of the alignment of a window pane and a door body in an "upside down positioning" before and during assembly.

FIG. 3 schematically illustrates the "upside down assembly" and depicts the motor vehicle door 2 held in the "upside down position" by means of the swivel arm 51 such that the top edge 21 of the door body 20 in the assembly position on the motor vehicle is disposed below the bottom edge 22 of the door body 20. The window lifter 3 connected with the door body 20 with the tabs 33, 34 guided in guide rails 31, 32, is in the "upside down position" with the door body 20, along with guide rolls 35 through 38, a window lifter drive 30, and the window lifter table 39.

The window pane 1 is placed into a jig 6 designed such that, as a result of gravity, the top edge 12 and at least one of the side edges 13, 14 lie against support edges or points 61 through 63 of the jig 6 and thus, align the window pane 1 in a predefined position. In this position, the window pane 1 is presented in the jig until the motor vehicle door 2 has reached a desired position in which the motor vehicle shaft in the door body 20 is aligned with the window pane 1.

By vertical movement of the window pane 1 with the jig 6 and/or the motor vehicle door 2, the distance between the bottom edge 11 of the window pane 1 and the tabs 33, 34 located in the top position (bottom in the assembly position) of the window lifter 3 is reduced until, in the adjustment and clamping position A, the attachment points 15, 16 of the window pane 1 are set non-positively and/or positively on the tabs 33, 34 of the window lifter 3.

Then, the window lifter 3 can be moved into position B such that the window pane 1 is in the position depicted by broken lines. In this position, the window pane 1 is lifted out of the jig 6, which can then be moved back into the starting position by means of the lifting device 8 depicted in FIG. 2.

Before the separation of the window pane 1 from the jig 6, additional function tests, characteristic value or characteristic curve recordings as well as comparisons of recorded values or curves with predefined limit values or set points can be performed. For example, the closing force and/or excess force of the window lifter 3 can be checked and possibly compared with reference values.

Simultaneously, the permanent clamping of the window pane 1, i.e., the connection of the attachment points 15, 16 of the window pane 1 to the tabs 33, 34, can be subjected to testing. Since the window pane 1 is located under the motor vehicle door 2, an inadequate clamping of the window pane 1 in the tabs 33, 34 would result in release of the attachment points 15, 16 from the tabs 33, 34 due to gravity and the window pane 1 would remain in the jig 6.

What is claimed is:

1. An upside down assembly method for connecting a window pane to a window lifter disposed in a door body of a motor vehicle door, comprising:

positioning the motor vehicle door and the window pane in an upside down position;

positioning the window pane below the door body;

aligning the door body and the window pane with each other for connection of at least one attachment point of the window pane with at least one attachment element in the door body; and reducing the distance between the attachment point and the attachment element until a predefined final position is reached.

2. The assembly method according to claim 1 wherein the window pane is held in the upside down position in a jig and wherein the door body and the jig are moved relative to each other until the at least one attachment point of the window pane has reached the predefined final position.

3. The assembly method according to claim 2 wherein the door body and the jig are brought into the upside down position by means of a guide device and wherein the guide device determines the path of the bringing together of the door body and the window pane until the predefined final position is reached.

4. The assembly method according to claim 2 wherein the bringing together of the window pane and the door body takes place by means of movement of one of the jig or the door body on a predefined assembly path.

5. The assembly method according to claim 1 wherein the upside down assembly takes place at an angle of inclination of the window pane which is less than 90° relative to a horizontal plane.

6. The assembly method according to claim 1, comprising:
- before connection of the window pane to the window lifter, moving the motor vehicle door by a conveyor device accommodating the motor vehicle door into a first predefined desired position;
- moving the window pane in a guide device accommodating the window pane on one of a top edge or at least one side edge into a second desired position; and
- after connection of the window pane with the window lifter, separating the guide device from the window pane.

7. The assembly method according to claim 6 wherein the window pane is placed before connection in a jig, the jig touching the window pane on at least three points that are distinct from each other.

8. The assembly method according to claim 7 wherein a plurality of window panes are placed in a magazine provided with a plurality of jigs and wherein the magazine is moved substantially perpendicular to a conveyance direction of the motor vehicle door into the second desired position.

9. The assembly method according to claim 1 wherein an edge outline of the window pane before connection is clamped in releasable attachment to a lifting device.

10. The assembly method according to claim 1 wherein the window lifter is moved into the final position near a top edge of the door body and the at least one attachment point of the window pane is temporarily connected with the at least one attachment element of the window lifter, and wherein the window lifter is moved with the window pane into an adjustment position (B) and the window pane is permanently connected with the window lifter in the adjustment position (B).

11. The assembly method according to claim 1 wherein one of the window pane or the window lifter is designed such that upon reaching the final position, the window pane is automatically connected with the window lifter.

12. The assembly method according to claim 1 wherein after completion of the assembly a function test of the window lifter occurs.

13. The assembly method according to claim 12 wherein the function test of the window lifter includes a jig.

14. The assembly method according to claim 12 wherein at least one of a closing force or an excess force of the window lifter is determined.

* * * * *